March 27, 1962

A. D. BULL 3,026,951

HYDRAULIC SOIL SAMPLER

Original Filed Aug. 7, 1953

INVENTOR
ALMOND D. BULL

BY *R. Hoffman*

ATTORNEY

March 27, 1962     A. D. BULL     3,026,951
HYDRAULIC SOIL SAMPLER

Original Filed Aug. 7, 1953     3 Sheets-Sheet 2

INVENTOR
ALMOND D. BULL

BY
R. Hoffman
ATTORNEY

March 27, 1962  A. D. BULL  3,026,951
HYDRAULIC SOIL SAMPLER
Original Filed Aug. 7, 1953  3 Sheets-Sheet 3

INVENTOR
ALMOND D. BULL

BY R. Hoffman
ATTORNEY

United States Patent Office 3,026,951
Patented Mar. 27, 1962

3,026,951
HYDRAULIC SOIL SAMPLER
Almond D. Bull, 520 S. 16th St., Chickasha, Okla.
Original application Aug. 7, 1953, Ser. No. 373,072, now Patent No. 2,868,019, dated Jan. 13, 1959. Divided and this application July 2, 1957, Ser. No. 675,790
4 Claims. (Cl. 175—168)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a division of Patent No. 2,868,019 which is a continuation-in-part of Patent No. 2,701,121.

This invention relates to a power-driven automatic soil-coring machine that is primarily designed to be mounted on a truck or other motor vehicle; and particularly relates to a machine for pressing an elongated tube into the ground for the purpose of making a rapid examination of soil profiles.

In Patent No. 1,701,121 I have disclosed such an apparatus in which the power for forcing the coring tube into the soil is obtained from an electric motor suitably coupled to the coring mechanism through a gear reduction system. Current is supplied to the motor by a generator driven by the vehicle engine.

I have now found that by substituting hydraulic power for electric power, it is possible to produce a smaller unit that can be mounted closer to the center of the vehicle bed. Such a unit also requires a fraction of the power needed for electrical operation, is more rapid, and requires less modification of the truck on which the apparatus is mounted. In addition, by further modifications and improvements described in detail below, it is possible to provide a machine of greater versatility.

An object of this invention is, therefore, to provide a soil-coring machine in which hydraulic power is used.

Another object is to provide a soil-coring machine of improved design that operates at a greater speed than machines previously available.

Another object is to provide a soil-coring machine that requires less power for its operation.

A still further object is to provide a machine that enables examination of soil profiles to greater depths than formerly possible.

The achievement of the above and other objects will become apparent from the following description and from the accompanying drawings.

Figure 1:
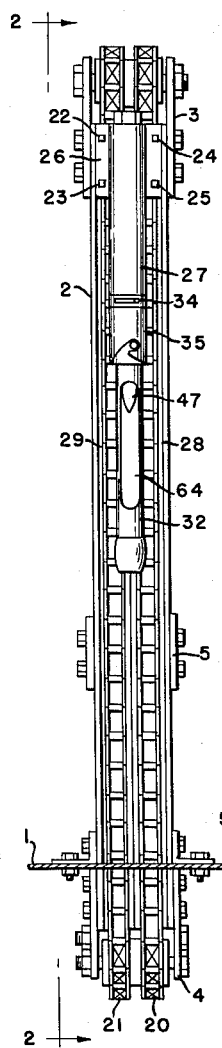
FIGURE 1 is a front view of the assembled apparatus.
Figure 2:
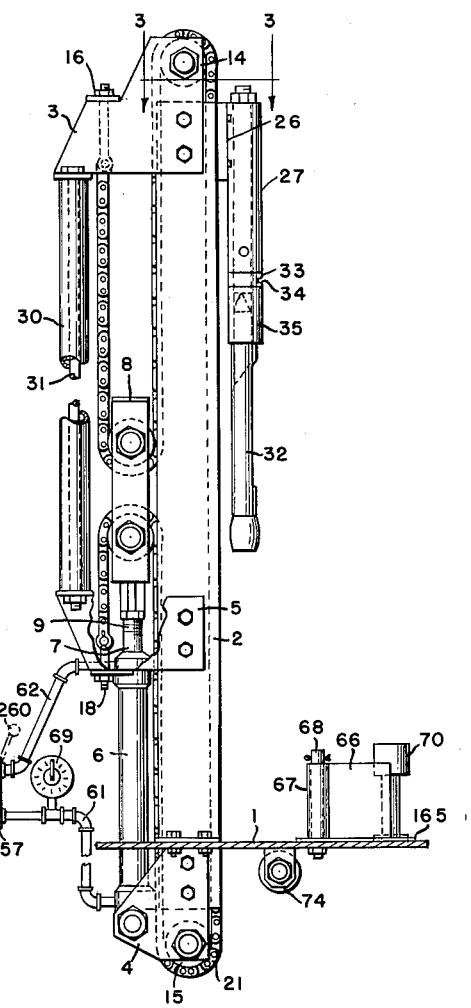
FIGURE 2 is a side view of the assembly shown in FIG. 1 taken from pane 2—2, to the left of FIG. 1, and also shows the hydraulic system.
Figure 3:
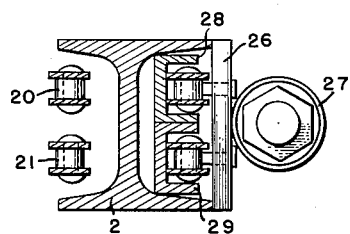
FIGURE 3 is a section at the top of the supporting column taken on plane 3—3 in FIG. 2 showing the method of mounting the driving head of the corner.
Figure 4:
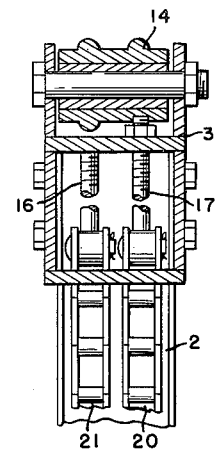
FIGURE 4 is a section showing the upper idler support bracket and the chain tensioning means.
Figure 5:
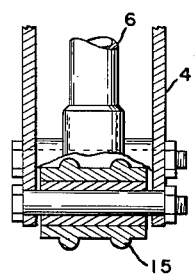
FIGURE 5 is a section showing the lower idler support with the lower hydraulic cylinder mounting.
Figure 6:
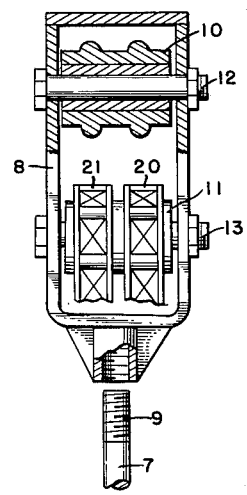
FIGURE 6 is section showing construction of the push-pull clevis and its connection to the cylinder piston.
Figure 7:
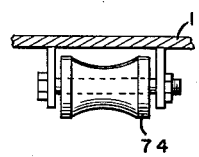
FIGURE 7 is a detail of the roller guide for the coring tube and driving head.

The apparatus is intended to be mounted on the floor board or bed of a vehicle, represented by 1 in FIGURES 1 and 2, with the coring tube extending downward through the floor.

Figure 11:
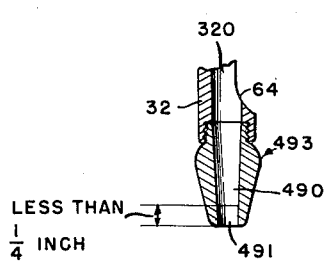
FIGURE 11 is a side sectional view of the lower end of the coring tube.
Figure 8:
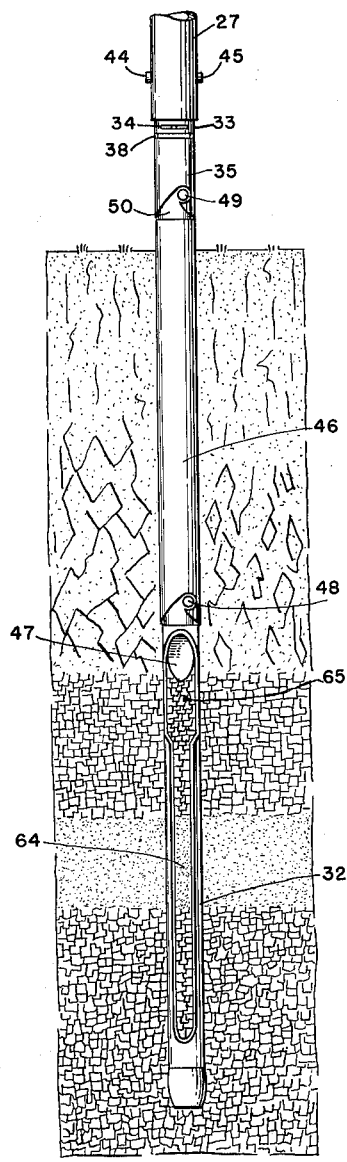
FIGURE 8 illustrates the method of taking a deep profile.

The apparatus comprises an I-beam 2 mounted vertically on the floor of the vehicle. Secured to both ends of the beam are a pair of mounting brackets 3 and 4; and mounted between lower bracket 4 and intermediate bracket 5 is double acting hydraulic cylinder 6. Cylinder piston 7 is secured to push-pull clevis 8 by means of threaded piston-end 9 screwed into the lower end of the push-pull clevis. Mounted in the clevis are two sprocket wheels 10 and 11, supported on bronze bearings and axles 12 and 13. Similar sprocket wheels 14 and 15 are mounted at the upper and lower extremities of brackets 3 and 4, respectively. A pair of parallel roller chains 20 and 21 passes, in sequence, over sprocket wheels 10, 14, 15, and 11. The ends of the chains are secured to brackets 3 and 5 by means of eye-bolts 16, 17, and 18, and by a fourth bolt (not shown) attached to bracket 5. Bolted to the chains by means of bolts 22, 23, 24, and 25 is plate 26 to which is welded, or otherwise secured, driving head 27. Chains 20 and 21 are guided in channel guides 28 and 29, welded into the I-beam 2, which serve to guide the chains and to restrict their movement to a generally vertical direction. To insure rigidity of the beam, concentric support braces 30 and 31 for thrust and tension, respectively, are permanently secured in any suitable manner to the upper and middle brackets. Mounted in the lower end of driving head 27 is coring tube 32. This tube is similar to the tube described in my above-mentioned copending application, except that an automatic slot-coupling has been provided to automatically couple the coring tube to either the driving head or extension tube. This constitutes one feature of the present invention and will be described in detail below. However, as indicated above, the rest of the coring tube is the same as that described in Patent No. 2,701,121. The cylindrical coring tube 32 is provided with a longitudinal opening or open face 64 (FIGURE 11) through which the speciment core may be examined. To the lower end of the tube is attached a soil coring point 493 provided with a short cylindrical section or cutter sleeve 491 of the same inside diameter as the cutting edge of soil coring point 493 and parallel to the longitudinal axis of soil coring tube 32, and from this point upward provided with an upwardly flaring conical bore 490. The diameter of the top of bore 490 is the same as that of cylindrical bore 320 of coring tube 32. The diameter of the lower cutting edge of bore 490 and cylindrical section 491 is slightly less than that of bore 320. The cylindrical section must be long enough to hold the cored soil, but not too long to introduce excessive friction which would prevent cutting a full length core.

While the automatic coupling device was primarily designed to provide a simple means for attaching the extension tube to get deep samples, it may obviously be used with a single coring tube, as shown in FIGURES 1 and 2. This device is made by modifying the driving head of my copending application as follows:

A short cylindrical member 33 is provided near its lower end with a slot 34 running only part way around its circumference. The coupling end consists of a cylindrical portion 35 made integral with a smaller diameter shaft portion 36. Shaft portion 36 is further provided with a threaded reduced section 37. The diameter of shaft 36 is such that it will fit loosely inside cylindrical member 33. In assembling the automatic coupling attachment, a thrust washer 38 is dropped over shaft 36 so that it rests on shoulder 39. Cylindrical sleeve 33 is then slipped over shaft 36 to have threaded portion 37 protrude from the upper end of the sleeve. A second thrust washer 40 is slipped over the threaded portion and the sleeve is secured to the coupling and shaft by means of nut 41. Screw 42 is then driven into threaded hole 43 in shaft 36 to limit the rotation of the coupling head to the angle defined by slot 34. The assembly is finally secured in driving head sleeve 27 by means of pins 44 and 45, and the unit is ready for operation. To permit coupling, coring tube 32 or extension tube 46 are provided with a coupling guide 47 inserted in the upper end of either the coring tube or extension tube and secured therein by means of pin 48. The protruding portion of the guide is of a diameter sufficiently small to permit free rotation inside 35 and has a pin 49 driven through it transversely which mates with the coupling slot 50 in member 35. The coupling slot consists of a triangular cut having walls 51 and 52. At the highest point of the slot there is cut a recess 53 provided with a lip 54. To couple either an extension tube or a coring tube, all that is necessary is to bring the coupling head down over the guide 47. Pin 49 bearing on the surfaces of triangular slot 50 will cause head 35 to rotate. When the pin 49 reaches the uppermost part of the slot it will drop into recess 53 and will be held there during operation of the apparatus until released manually. To uncouple, one has only to twist coupling head 35 by hand in the direction opposite to that followed during coupling, and the coring tube or extension tube is quickly and easily released.

Figure 9:
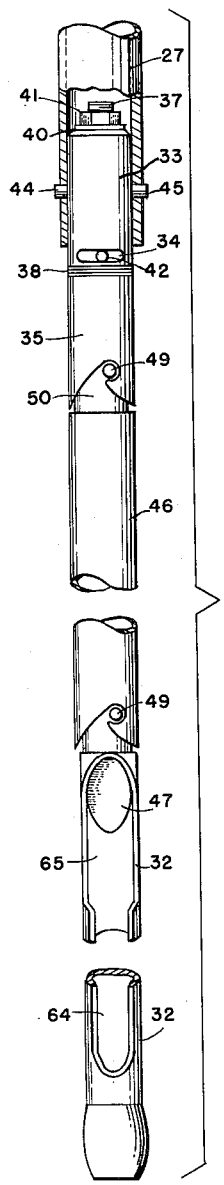
FIGURE 9 shows an assembly of the driving head, extension, and coring tube.
Figure 10:
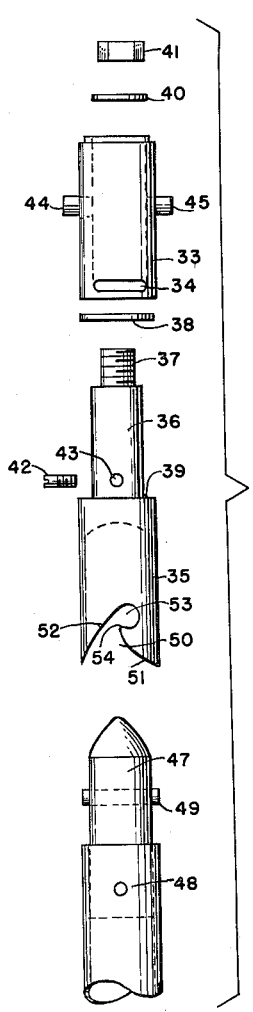
FIGURE 10 is an exploded view showing the details of construction of the automatic slot coupling for the extension and coring tube.

As will be apparent from the foregoing description and from FIGURES 1, 2 and 9 of the drawings, the rigid attachment of driving head 27 to plate 26 prevents any rotational movement of the former. Because cylindrical member 33 is secured in driving head 27 by means of pin 45, member 33 also cannot rotate. Thus when the coring tube is inserted into cylindrical member 35 and the latter is secured in member 33, pin 49, which is held in recess 53 of slot 50, prevents any rotational movement of the coring tube. In this manner, the coring tube is restricted to the substantially vertical motion of driving head 27 imparted to the latter by channel guides 28 and 29.

To operate the apparatus, I have provided a conventional hydraulic system required to energize the double acting piston 6. This system may consist essentially of hydraulic reservoir 55, pump 56, control valve 57, and various hydraulic lines, valves, couplings, etc., constituting such a conventional system. Power for pump 56 is obtained from a power take-off on the drive shaft of the truck, not shown, through pulley 58 keyed to shaft 59 of pump 56.

The position of lever 60 on control valve 57 determines the direction of travel of cylinder piston 7, and, hence, of coring tube 32. Throwing lever 60 to position 160, for example, causes hydraulic fluid to be pumped through line 61 into the bottom of cylinder 6, forcing piston 7 upwards. Clevis 8, secured to the end of the piston is carried upward, pulling roller chains 20 and 21 with it. The chains are kept inside channel guides 28 and 29 by the horizontal component of the forces pulling the chain downward along the I-beam. Since driving head 27 is rigidly secured to the chains through plate 26, the latter travels downward, forcing coring tube 32 into the ground. To insure that driving head 27 does not get caught on bed plate 1, a roller guide 74 is mounted beneath the latter. Driving head 27 is thereby constrained to travel between the roller guide and I-beam 2. The distance traversed by the tube is twice the length of the piston stroke. To withdraw the tube from the ground, control lever 60 is pushed to the 260 position, causing a reversal in the direction of flow of hydraulic fluid. The latter is now forced into the top of cylinder 6 through line 62, forcing piston 7 downward, and pulling the coring tube out of the ground. Since the length of stroke is determined entirely by the length of the cylinder and piston, no auxiliary limit stop means are required in this apparatus to control the distance traveled by the coring tube and to stop it at the top or bottom of its stroke. Motion stops automatically as soon as the piston is either fully extended or fully retracted.

If it is desired to take a deeper sample than is possible with the length of coring tube used, all that is necessary is to uncouple the driving head from the tube in the manner previously described when the latter is in the ground, raise the driving head to its uppermost position, couple in the extension tube 46, and reenter the hole. As soon as the extension tube and coring tube contact they couple automatically; and continuing the downward travel of the extension tube forces the coring tube into the ground to a further depth. To recover the coring tube, direction of travel is reversed. When the extension tube is fully withdrawn, it is uncoupled, driving head again is lowered until it couples with the coring tube, and both the driving head and coring tube are raised together.

After the soil sample has been taken and examined through viewing slot 64 of the coring tube, the latter may be emptied by inverting and permitting the soil to fall out of slot enlargement 65 at the top end of the viewing slot. However, soils may be encountered which are so dense that it would not be possible for the soil to fall freely from the coring tube. To enable the latter to be cleaned rapidly, I have also provided the apparatus with the cleaning device designated by reference characters 66, 67, 68, 70, and 165 in FIGURE 2. This cleaning device is more fully described and claimed in my Patent No. 2,881,933.

I claim:
1. Apparatus for obtaining a soil profile core specimen comprising: an elongated coring tube having an earth-penetrating edge at its lower end; hydraulic powered means for applying a pressing force adjacent the upper end of the coring tube in a direction axial thereto; said hydraulic powered means comprising a double acting hydraulic cylinder, roller chains secured to the piston of said cylinder, said chains being adapted to be driven in an upward and a downward direction by said piston, means for securing the coring tube to the chains, said double acting cylinder being so positioned that the coring tube penetrates into the soil to the desired point when the piston is extended its maximum distance out of the cylinder and so that the coring tube is withdrawn upwardly to the desired point when the piston is retracted into the cylinder its maximum distance; guide means positioned adjacent the path of travel of the coring tube to constrain said tube to substantially a vertical path; and means for preventing rotational movement of the coring tube during its penetration into and withdrawal from the soil.

2. The apparatus of claim 1 in which an extension tube is coupled between the means for securing the coring tube to the chains and the coring tube, whereby soil profile samples may be taken from greater depth.

3. Apparatus for obtaining an undisturbed soil profile core comprising: a mobile chassis; a vertically extending elongated soil coring tube having an earth-penetrating edge at its lower end; hydraulically powered means on said chassis for applying a downwardly and an upwardly acting force to the upper end of said coring tube, said hydraulically powered means including a double-acting hydraulic cylinder, roller chains connected to said hydraulic cylinder and means for rigidly attaching the upper end of said coring tube to said roller chains; rigid, vertically extending means secured to said chassis for supporting and guiding said chains in a generally vertical direction when said hydraulic cylinder is actuated; and means for preventing rotational movement of the coring tube during its penetration into and withdrawal from the soil.

4. Apparatus for obtaining a soil profile core specimen comprising: an elongated coring tube having an earth-penetrating edge at its lower end; hydraulic power driven means for applying a pressing force adjacent the upper end of the coring tube in a direction axial thereto, said hydraulic power driven means including a double acting hydraulic cylinder, roller chains, means connecting said chains to said hydraulic cylinder for upward and downward movement of the chains, and means for attaching the upper end of the coring tube to links of the chains, said hydraulic cylinder being so positioned that the coring tube penetrates into the soil to the desired point when the piston of the cylinder is extended to its maximum distance out of the cylinder and so that the coring tube is withdrawn upwardly to the desired point when the piston is retracted into the cylinder its maximum distance; guide means for constraining the coring tube to movement in a substantially vertical direction; and means for preventing rotational movement of the coring tube during its penetration into and withdrawal from the soil.

References Cited in the file of this patent

UNITED STATES PATENTS

| | | |
|---|---|---|
| 2,075,706 | Curtis | Mar. 30, 1937 |
| 2,088,649 | Hart | Aug. 3, 1937 |
| 2,280,592 | Le Mieux | Apr. 21, 1942 |
| 2,510,865 | Cooper | June 6, 1950 |
| 2,643,858 | Hardman | June 30, 1953 |
| 2,711,880 | McKenzie | June 28, 1955 |